United States Patent

Neumann et al.

(10) Patent No.: US 10,242,355 B2
(45) Date of Patent: Mar. 26, 2019

(54) WIRELESS POWER SUPPLY TO ENABLE PAYMENT TRANSACTION

(71) Applicant: NXP B.V., Eindhoven (NL)

(72) Inventors: Kai Neumann, Hamburg (DE); Johannes van Lammeren, Beuningen (NL); Klaas Brink, Waaire (NL)

(73) Assignee: NXP B.V., Eindhoven (NL)

( * ) Notice: Subject to any disclaimer, the term of this patent is extended or adjusted under 35 U.S.C. 154(b) by 386 days.

(21) Appl. No.: 14/081,515

(22) Filed: Nov. 15, 2013

(65) Prior Publication Data

US 2015/0142653 A1    May 21, 2015

(51) Int. Cl.
  *G06Q 20/40*  (2012.01)
  *G06Q 20/32*  (2012.01)
  *G07F 15/00*  (2006.01)

(52) U.S. Cl.
  CPC ......... *G06Q 20/3278* (2013.01); *G06Q 20/40* (2013.01); *G07F 15/006* (2013.01)

(58) Field of Classification Search
  CPC .............................. G06Q 20/08; G06Q 20/40
  USPC .......................................................... 705/44
  See application file for complete search history.

(56) References Cited

U.S. PATENT DOCUMENTS

| | | | | |
|---|---|---|---|---|
| 8,559,987 B1 * | 10/2013 | Fisher | .................... | G06Q 20/20 235/380 |
| 9,240,824 B2 * | 1/2016 | Hillan | ..................... | H04B 5/00 |
| 2007/0257767 A1 | 11/2007 | Beeson | | |
| 2008/0149716 A1 | 6/2008 | Sakai | | |
| 2012/0144461 A1 * | 6/2012 | Rathbun | ............... | H04L 9/3213 726/5 |
| 2012/0290470 A1 | 11/2012 | Lee et al. | | |
| 2012/0311322 A1 * | 12/2012 | Koyun et al. | ................. | 713/156 |
| 2013/0007873 A1 | 1/2013 | Prakash et al. | | |
| 2013/0200999 A1 * | 8/2013 | Spodak et al. | ............... | 340/5.65 |
| 2015/0006395 A1 * | 1/2015 | Chu | ....................... | G06Q 20/40 705/44 |

FOREIGN PATENT DOCUMENTS

| | | |
|---|---|---|
| CN | 102184605 | 9/2011 |
| CN | 2025136 19 | 10/2012 |
| EP | 1770606 A1 | 4/2007 |
| EP | 2 693 384 A1 | 2/2014 |

(Continued)

OTHER PUBLICATIONS

Ion et al., Don't trust POS terminals! Verify in-shop payments with your phone, Iulia Ion and Boris Dragovic, 2008 (10 pages).

(Continued)

*Primary Examiner* — Robert R Niquette
*Assistant Examiner* — Liz P Nguyen

(57) ABSTRACT

A method for completing a transaction at a terminal between a terminal and a mobile device including: initiating a transaction at the terminal; initiating communication with the mobile device; determining that the mobile device is without power; transmitting a wireless power signal to power the mobile device; sending a transaction authentication request message to the mobile device after transmitting the wireless power signal; receiving an authentication message from the mobile device; and completing the transaction after receiving the authentication message from the mobile device.

20 Claims, 4 Drawing Sheets

(56) References Cited

FOREIGN PATENT DOCUMENTS

WO     PCT-2008/114931 A1    9/2008
WO     2010/111002 A1    9/2010

OTHER PUBLICATIONS http://www.dailymail.co.uk/sciencetech/article-1350709/iPhone-5-credit-card-Pay-shopping-swipe-mobile-phone.html.
https://developer.visa.com/paywavemobile/ (4 pages).
http://money.cnn.com/gallery/technology/2012/09/24/mobile-payment-apps/index.html (1 page).
Appendix A, Payment by phone trial, Dutch Newspaper (Sep. 2, 2013) Na Kenia nu ook in Leiden: bealen met mobiele telefoon (1 page).
http://en.wikipedia.org/wiki/Google_Wallet—Google Wallet (6 pages).
Extended European Search Report for Application No. 14187899.1 (dated Mar. 27, 2015).

\* cited by examiner

WIRELESS POWER SUPPLY TO ENABLE PAYMENT TRANSACTION

TECHNICAL FIELD

Various exemplary embodiments disclosed herein relate generally to powering devices for transactions.

BACKGROUND

Today mobile devices are widely used for various tasks include conducting various transactions, for example, paying for goods or services from a merchant. These mobile devices may interact with terminal devices in order to carry out these transactions.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various exemplary embodiments relate to a method for completing a transaction at a terminal between a terminal and a mobile device including: initiating a transaction at the terminal; initiating communication with the mobile device; determining that the mobile device is without power; transmitting a wireless power signal to power the mobile device; sending a transaction authentication request message to the mobile device after transmitting the wireless power signal; receiving an authentication message from the mobile device; and completing the transaction after receiving the authentication message from the mobile device.

Further, various exemplary embodiments relate to a method for completing a transaction at a terminal between a terminal and a mobile device, wherein the transaction is initiated by the mobile device, including: transmitting a wireless power signal to power the mobile device; initiating communication with the mobile device; determining that the mobile device would like to perform a transaction; receiving an authentication message from the mobile device; and completing the transaction after receiving the authentication message from the mobile device.

Further, various exemplary embodiments relate to a transaction terminal system for completing transactions by interacting with a mobile device, including: a user communication interface configured to communicate with a mobile device; a wireless power supply configured to provide wireless power to a mobile device; and terminal controller configured to control the user communication interface and the wireless power supply and configured to determine when the mobile device is without power and then to control supplying wireless power to the mobile device.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
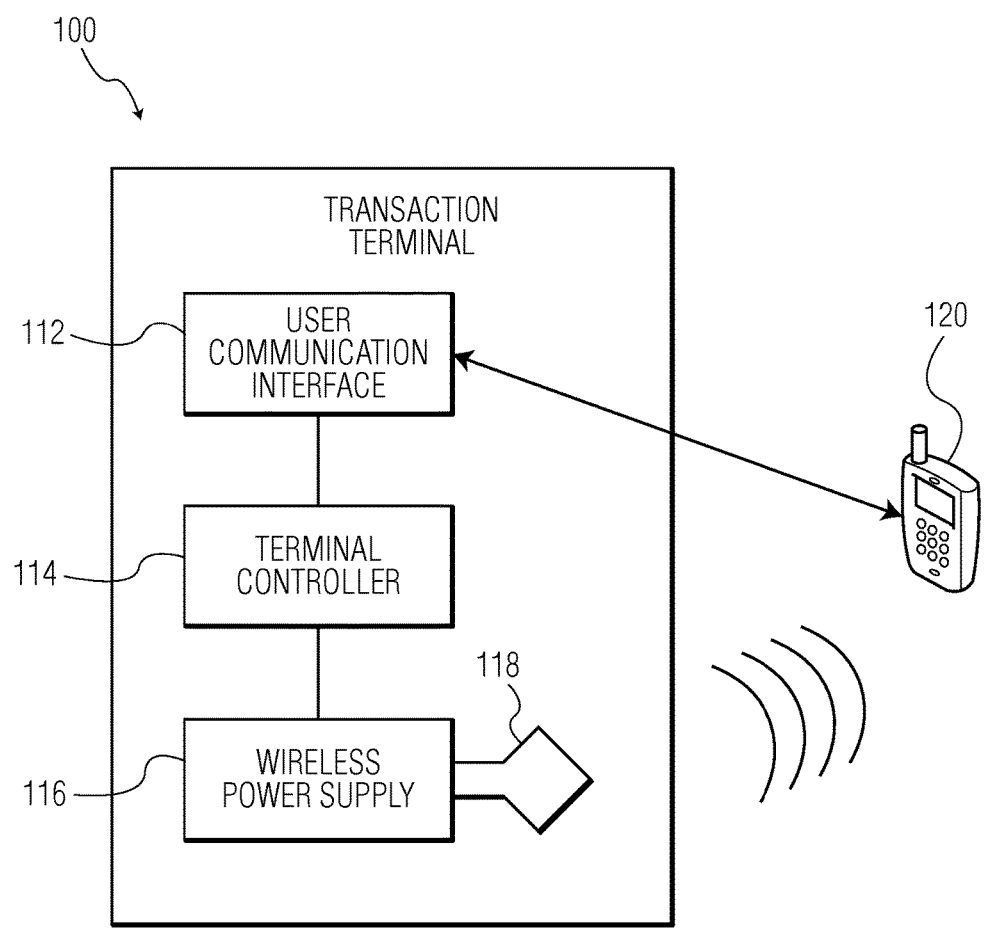
FIG. 1 illustrates an embodiment of a transaction system.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. As used herein, the terms "context" and "context object" will be understood to be synonymous, unless otherwise indicated.

Businesses and other entities may implement transaction terminals that interact with mobile devices to conduct various transactions. Typically such transactions will require some sort of authentication such as when paying for purchased items or exchanging sensitive information such as personal identifying information or login information. Such mobile devices may include mobile phones, tables, laptops, MP3 players, etc. The communication between the transaction terminal and the mobile device may occur directly using various known protocols including near field communications (NFC), Wi-Fi, Bluetooth, etc. Alternatively, the communication between the transaction terminal and the mobile device may communicate via a third party network such as the internet.

A transaction may be initiated by either the transaction terminal or the mobile device. For example, if a user purchases items at a store and desires to pay using their mobile device, the user may indicate to the transaction terminal such desire. The transaction terminal may then initiate communication with the mobile device using any of the methods described above. The mobile device may provide necessary authentication information to the transaction terminal in order to complete the transaction. Further, the mobile device may require some sort of user input before authenticating the purchase transaction using various authentication techniques such as entry of a personal identification number (PIN), password, fingerprint scan or other biometric authentication, etc., or a combination of these authentication techniques.

In other alternative embodiments, the mobile device may be used to initiate and complete transactions. For example, an application on the mobile device may be used to conduct the transaction. A user may select an item for purchase. This may be accomplished by scanning a bar code on the item or by selecting the item for sale in the application. The user may then initiate payment using the application. The application may require that one or more authentication technique be used as described above.

Financial transactions may involve payment institutions such as the user's bank, credit card company, other financial institution, account with the store where the purchase is being made, or another payment system such as those used on the internet. Such financial transactions may require specific authentication techniques and procedures based upon the payment institution.

Such systems may also involve other sorts of transactions. For example, borrowing items from a library, accessing a transit system, accessing a secure facility or home, accessing subscription information data bases, or any other sort of transaction requiring authentication. The use of mobile devices has expanded rapidly to provide a method of quickly and securely providing authentication in many of these types of transactions, especially payment transactions.

A problem may arise when a user of a mobile device depends upon the mobile device to complete a transaction as described above, but their mobile device has run out of battery power. This problem may be overcome by the transaction terminal providing wireless power to the user's mobile device. Once the user's mobile device is powered on using the wireless power source, the user may complete the transaction with the transaction terminal. Below various embodiments of systems and methods are described to accomplish this.

FIG. 1 illustrates an embodiment of a transaction system. The transaction system 100 may include a transaction terminal 110 and a mobile device 120. The transaction terminal 110 may include a user communication interface 112, a terminal controller 114, a wireless power supply 116, and a wireless power supply antenna 118.

The user communication interface 112 interfaces with the user mobile 120. The user communication interface may use various wireless communication protocols as described above or communicate via a third party network such as the internet. The terminal controller 114 controls the overall operation of the transaction terminal 110. The terminal controller 114 may include a processor and software or may be an application specific integrated circuit (ASIC). The terminal controller 114 communicates with the user communication interface 112 and the wireless power supply 116. Also, the terminal controller 114 may have a communication interface to communicate with the backend systems of the owner of the transaction terminal. For example the terminal controller 114 may communicate with a cash register, computer system, or other database or inventory systems of the owner of the transaction terminal. The wireless power supply 116 and the wireless power supply antenna 118 may produce radio wave radiation that may be received by the mobile device 120 to power the mobile device 120. Such wireless power supply 116 may include any known wireless power supply system or protocol. The wireless power supply 116 may be selected to provide sufficient power to power the mobile device 120. In alternate embodiments, the wireless power supply 116 and wireless power antenna 118 may be external to the transaction terminal or may even be a distributed system with multiple wireless power supplies 116 and wireless power antennas 118 that provide a wireless power capability over a desired area, for example, in a certain area around a cash register.

As described above the mobile device 120 may be any mobile device capable of communicating with the transaction terminal 110 that provides user authentication for the transaction between the transaction terminal and the mobile device. The mobile device 120 may communicate wirelessly either directly with the transaction terminal 110 or via a third party network such as a wireless service provider connected to the internet. Further, the mobile device 120 may include circuitry to power the mobile device 120 from radio wave radiation received from the transaction terminal 110. Also, the mobile device 120 may include a NFC chip. Such NFC chip may be read by the transaction terminal 110. The NFC chip may include information indicating the presence of the mobile device 120, identification information for the mobile device and its user, or information indicating that the mobile device has not battery power. When the transaction terminal detects the NFC chip in the mobile device 120 and determines that the mobile device 110 does not have power, the transaction terminal 110 may turn on its wireless power supply 116 in order to turn on the mobile device to complete a transaction.

A few embodiments demonstrating the operation of a transaction system will be described below. The following embodiments will be described in the context of a user purchasing items from a merchant and using a mobile device with a transaction terminal to pay for the items. It is to be understood that the embodiments described below could be used with other types of transactions as well as described above.

Figure 2:
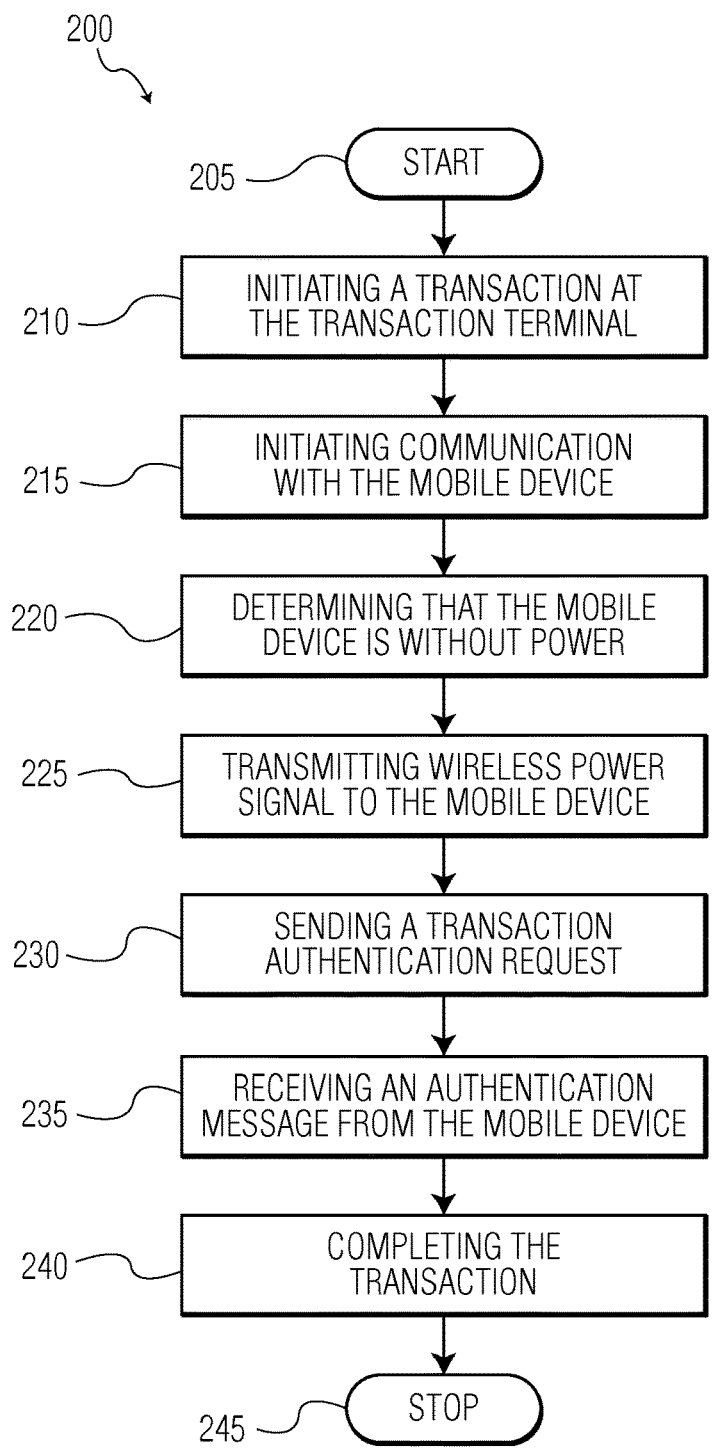
FIG. 2 illustrates a method for completing a transaction at a transaction terminal between the transaction terminal and the mobile device.

FIG. 2 illustrates a method for completing a transaction at a transaction terminal between the transaction terminal and the mobile device. The transaction terminal 110 may first initiate a transaction 210. This may occur when a user seeks to purchase items from a merchant using their mobile device to pay for the items. Once the total amount due is determined by the merchant, such information may be passed to the transaction terminal in order to receive payment for the items from the user via their mobile device. Next, the transaction terminal 110 may initiate communication 215 with the mobile device 120. As described above this may be done using various methods of communication. Next, if the mobile device is without power, the transaction terminal 110 may determine that the mobile device 120 is without power 220. If the mobile device 120 is without power, then the transaction terminal 110 may transmit a wireless power signal 225 to power the mobile device 120. Such power will allow the mobile device 110 to become active. Next, the transaction terminal 110 may send a transaction authentication request message to the mobile device 120 after transmitting the wireless power signal 230. The transaction authentication request message may any message that indicates to the mobile device 120 that the transaction terminal 110 would like authentication to perform a transaction that requires authentication. It may include various identifying information for the transaction and the parties in the transaction. At this point the user may enter the necessary authentication information such as described above to authorize the transaction. The mobile device 120 may then send an authentication message in response the user entering the proper authentication information. The authentication message may include the information required by the transaction terminal in order to authenticate the transaction. Then the transaction terminal 110 may receive the authentication message from the mobile device 120 to authorize the transaction 235. Finally, the transaction terminal 110 may complete the transaction 240 in response to the authentication message.

Figure 3:
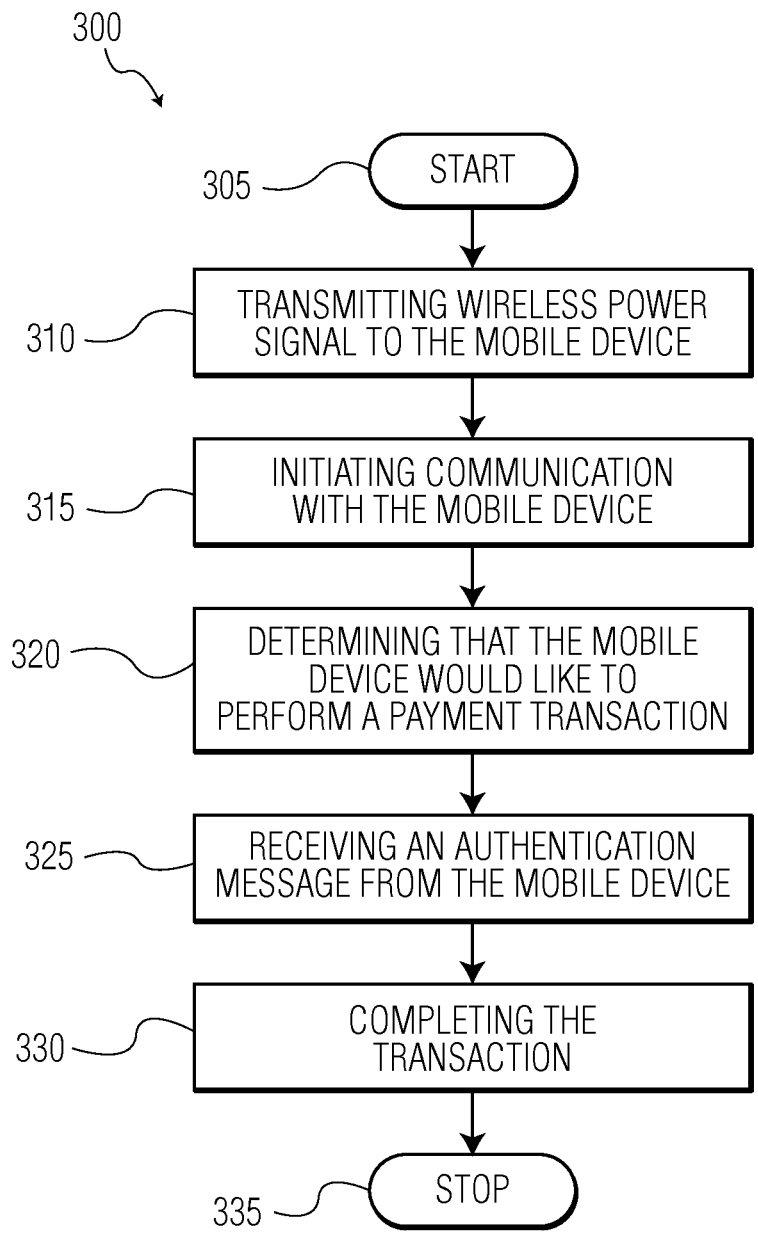
FIG. 3 illustrates another method for completing a transaction at a transaction terminal between the transaction terminal and the mobile device.

FIG. 3 illustrates another method for completing a transaction at a transaction terminal between the transaction terminal and the mobile device. In this embodiment, the mobile device 120 initiates the transaction. The transaction terminal 110 may transmit a wireless power signal 310 to power the mobile device 120. Such power will allow the mobile device 120 to become active if the device is without power. Next, the transaction terminal 110 may initiate communication 315 with the mobile device 120. As described above this may be done using various methods of communication. Then the transaction terminal 110 may determine that the mobile device would like to perform a payment transaction 320. This may be done when the mobile device 120 has an application or capability to initiate payment to the transaction terminal 110. Next, the transaction terminal 110 may receive an authentication message from the mobile device 120 to authorize the transaction 325. Finally, the transaction terminal 240 may complete the transaction 335. Also, the transaction terminal 110 may determine that the mobile device 120 is not performing a payment transaction when initiating communication with the mobile device 120. In such a situation, the transaction terminal 110 may turn off the wireless power signal.

Figure 4:
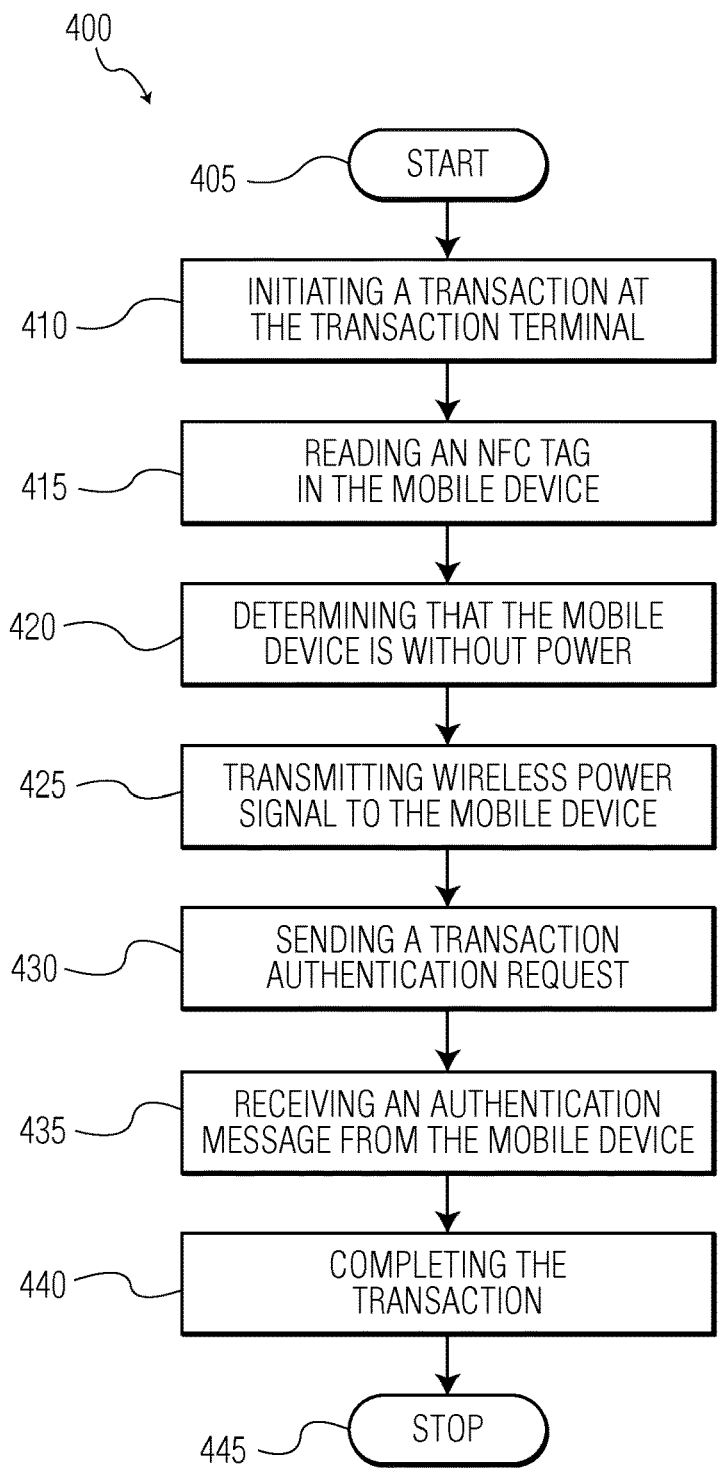
FIG. 4 illustrates another method for completing a transaction at a transaction terminal between the transaction terminal and the mobile device.

FIG. 4 illustrates another method for completing a transaction at a transaction terminal between the transaction terminal and the mobile device. The transaction terminal 110 may first initiate a transaction 410. This may occur when a user seeks to purchase items from a merchant using their mobile device to pay for the items. Once the total amount due is determined by the merchant, such information may be passed to the transaction terminal in order to receive payment for the items from the user via their mobile device. Next, the transaction terminal 110 may read an NFC tag in the mobile device 120. The When the mobile device 120 is about to run out of power, it may write information to this affect into the NFC tag. When the mobile device receives power again this data may be erased. Next, if the mobile device is without power as indicated by information read from the NFC tag, the transaction terminal 110 may determine that the mobile device 120 is without power 420. If the mobile device 120 is without power, then the transaction terminal 110 may transmit a wireless power signal 425 to power the mobile device 120. Such power will allow the mobile device 110 to become active. Next, the transaction terminal 110 may send a transaction authentication request message to the mobile device 120 after transmitting the wireless power signal 430. At this point the user may enter the necessary authentication information such as described above to authorize the transaction. The mobile device 120 may then send an authentication message in response the user entering the proper authentication information. Then the transaction terminal 110 may receive an authentication message from the mobile device 120 to authorize the transaction 435. Finally, the transaction terminal 110 may complete the transaction 440 in response to the authentication message.

It should be noted that various aspects of the above embodiments may be combined resulting in other embodiments. Also, various steps in the methods may be performed in a different order or simultaneously. Also various aspects of the embodiments above may be implemented using processors and computer instructions to result in a specific machine implementing the embodiment. Also, portions of the embodiments above may be implemented using ASICs or other specific hardware elements.

As used herein, the term "processor" will be understood to encompass a variety of devices such as microprocessors, field-programmable gate arrays (FPGAs), application-specific integrated circuits (ASICs), and other similar processing and computing devices.

Other embodiments that use wireless power capabilities between a transaction terminal and mobile device powered by the wireless power in order to complete a transaction are envisioned.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method for completing a transaction at a terminal between a terminal and a mobile device comprising:
    initiating, by the terminal, the transaction associated with the mobile device at the terminal;
    initiating, by the terminal, communication with the mobile device;
    determining, by the terminal, that the mobile device includes a near field communication (NFC) chip;
    determining, by the terminal, that the mobile device is without power;
    transmitting, by the terminal, a wireless power signal to power the mobile device to complete the transaction based on the determination that the mobile device includes the NFC chip;
    sending, by the terminal, a transaction authentication request message to the mobile device after transmitting the wireless power signal;
    receiving, by the terminal, a transaction authentication message from the mobile device; and
    completing, by the terminal, the transaction after receiving the authentication message from the mobile device.

2. The method of claim 1, wherein determining that the mobile device is without power includes reading information from the NFC chip in the mobile device, wherein the read information indicates that the mobile device is without power.

3. The method of claim 1, wherein initiating communication with the mobile device includes using one of Bluetooth, Wi-Fi, and near field communication.

4. The method of claim 1, wherein initiating communication with the mobile device includes using a third party network accessible by both the transaction terminal and the mobile device.

5. The method of claim 1, wherein the received authentication message is sent when a user enters one of a personal identification number or a password on the mobile device.

6. The method of claim 1, wherein the received authentication message is sent when a user presents biometric information to the mobile device.

7. A method for completing a transaction between a terminal and a mobile device, wherein the transaction is initiated by the mobile device, comprising:
    determining, by the terminal, that the mobile device includes a near field communication (NFC) chip;
    determining, by the terminal, that the mobile device is without power;

transmitting, by the terminal, a wireless power signal to power the mobile device to complete the transaction based on the determination that the mobile device includes the NFC chip;

initiating, by the terminal, communication with the mobile device;

determining, by the terminal, that the mobile device would like to perform the transaction;

receiving, by the terminal, a transaction authentication message from the mobile device; and completing, by the terminal, the transaction after receiving the authentication message from the mobile device.

8. The method of claim 7, wherein determining that the mobile device is without power includes reading information from the NFC chip in the mobile device, wherein the read information indicates that the mobile device is without power.

9. The method of claim 7, wherein initiating communication with the mobile device includes using one of Bluetooth, Wi-Fi, and near field communication.

10. The method of claim 7, wherein initiating communication with the mobile device includes using a third party network accessible by both the transaction terminal and the mobile device.

11. The method of claim 7, wherein the received authentication message is sent when a user enters one of a personal identification number or a password on the mobile device.

12. The method of claim 7, wherein the received authentication message is sent when a user presents biometric information to the mobile device.

13. A transaction terminal system for completing transactions by interacting with a mobile device, comprising:

a user communication interface configured to communicate with the mobile device;

a wireless power supply configured to provide wireless power to the mobile device to complete the transaction; and a terminal controller configured to control the user communication interface and the wireless power supply and configured to determine whether the mobile device includes a near field communication (NFC) chip and configured to determine when the mobile device is without power and then to control supplying wireless power to the mobile device if the mobile device includes the NFC chip.

14. The system of claim 13, wherein the wireless power supply includes a plurality of wireless power supplies configured to provide wireless power in a specified area.

15. The system of claim 13, wherein terminal controller is further configured to initiate a transaction at the terminal.

16. The system of claim 13, wherein terminal controller is further configured to initiate communication with the mobile device.

17. The system of claim 13, wherein terminal controller is further configured to send a transaction authentication request message to the mobile device after transmitting the wireless power signal, receive an authentication message from the mobile device, and complete the transaction after receiving the authentication message from the mobile device.

18. The system of claim 13, wherein user communication interface is configured to communicate with the mobile device using one of Bluetooth, Wi-Fi, and near field communication.

19. The system of claim 13, wherein user communication interface is configured to communicate with the mobile device using a third party network accessible by both the transaction terminal and the mobile device.

20. The system of claim 13, wherein determining that the mobile device is without power includes reading information from the NFC chip in the mobile device, wherein the read information indicates that the mobile device is without power.

* * * * *